US012677092B2

(12) United States Patent
Nagahama et al.

(10) Patent No.: US 12,677,092 B2
(45) Date of Patent: Jul. 7, 2026

(54) SOUND OUTPUT DEVICE

(71) Applicant: SONY GROUP CORPORATION, Tokyo (JP)

(72) Inventors: Yukio Nagahama, Tokyo (JP); Koji Miura, Tokyo (JP); Hiroyuki Shirakawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 156 days.

(21) Appl. No.: 18/713,413

(22) PCT Filed: Nov. 17, 2022

(86) PCT No.: PCT/JP2022/042749
§ 371 (c)(1),
(2) Date: May 24, 2024

(87) PCT Pub. No.: WO2023/100674
PCT Pub. Date: Jun. 8, 2023

(65) Prior Publication Data
US 2025/0024196 A1 Jan. 16, 2025

(30) Foreign Application Priority Data
Dec. 2, 2021 (JP) ................................. 2021-196376

(51) Int. Cl.
*H04R 1/34* (2006.01)
*H04R 1/02* (2006.01)
*H04R 1/28* (2006.01)

(52) U.S. Cl.
CPC ............. *H04R 1/345* (2013.01); *H04R 1/023* (2013.01); *H04R 1/288* (2013.01); *H04R 1/025* (2013.01)

(58) Field of Classification Search
CPC ........ H04R 1/345; H04R 1/023; H04R 1/288; H04R 1/025; H04R 1/26; H04R 1/02; H04R 1/28; H04R 1/30; H04R 1/34
See application file for complete search history.

(56) References Cited

U.S. PATENT DOCUMENTS

2005/0265570 A1 12/2005 Isotalo
2018/0054671 A1 2/2018 Voishvillo

FOREIGN PATENT DOCUMENTS

JP 54-050535 U 4/1979
JP 03-192899 A 8/1991
(Continued)

OTHER PUBLICATIONS

International Search Report and Written Opinion of PCT Application No. PCT/JP2022/042749, issued on Feb. 7, 2023, 11 pages of ISRWO.

*Primary Examiner* — Tuan D Nguyen
(74) *Attorney, Agent, or Firm* — CHIP LAW GROUP

(57) ABSTRACT

A sound output device includes a speaker unit that includes a diaphragm and outputs sound in a full-range frequency band and a sound control body that includes a sound guiding portion through which sound output from the speaker unit passes, in which the sound guiding portion has an opening on the speaker unit side, the opening being provided as a sound input part, and has an opposite opening on a side opposite to the sound input part, the opposite opening being provided as a sound output part, the sound output part is formed in a shape having a width direction and a length direction, and the sound output part has a width smaller than that of the diaphragm.

9 Claims, 9 Drawing Sheets

(56) References Cited

FOREIGN PATENT DOCUMENTS

| | | | |
|---|---|---|---|
| JP | 5-080093 | U | 10/1993 |
| JP | 06-121387 | A | 4/1994 |
| JP | 06-319095 | A | 11/1994 |
| JP | 07-245796 | A | 9/1995 |
| JP | 10-066182 | A | 3/1998 |
| JP | 10-174188 | A | 6/1998 |
| JP | 2000-165974 | A | 6/2000 |
| JP | 2000-165978 | A | 6/2000 |
| JP | 2010-136248 | A | 6/2010 |

SOUND OUTPUT DEVICE

CROSS REFERENCE TO RELATED APPLICATIONS

This application is a U.S. National Phase of International Patent Application No. PCT/JP2022/042749 filed on Nov. 17, 2022, which claims priority benefit of Japanese Patent Application No. JP 2021-196376 filed in the Japan Patent Office on Dec. 2, 2021. Each of the above-referenced applications is hereby incorporated herein by reference in its entirety.

TECHNICAL FIELD

The present technology relates to a technical field of a sound output device including a speaker unit that outputs sound.

BACKGROUND ART

A sound output device including a speaker unit that outputs sound has been known (see, for example, Patent Document 1).

The sound output device described in Patent Document 1 has a configuration in which a portion in the vicinity of an opening from which sound is output is formed in an uneven shape to form a reinforcement rib, and the reinforcement rib suppresses generation of mechanical vibration, and stable acoustic characteristics are ensured.

CITATION LIST

Patent Document

Patent Document 1: Japanese Patent Application Laid-Open No. 2000-165978

SUMMARY OF THE INVENTION

Problems to be Solved by the Invention

By the way, in such a sound output device as described above, it is desirable to ensure a good listening state of the sound for the user according to the output state of the sound to a wide region by improving the performance.

On the other hand, by limiting the frequency band (output band) of the sound of the speaker unit, it is possible to improve the acoustic characteristics and improve the sound quality, but it is more desirable to improve the acoustic characteristics with the output state of the sound in a wide frequency band of the speaker unit being secured.

Thus, an object of the sound output device of the present technology is to achieve a wider directionality with a wide bandwidth of the sound output from the speaker unit being secured.

Solutions to Problems

A sound output device according to the present technology includes: a speaker unit that includes a diaphragm and outputs sound in a full-range frequency band; and a sound control body that includes a sound guiding portion through which sound output from the speaker unit passes, in which the sound guiding portion has an opening on a side of the speaker unit, the opening being provided as a sound input part, and has an opposite opening on a side opposite to the sound input part, the opposite opening being provided as a sound output part, the sound output part is formed in a shape having a width direction and a length direction, and the sound output part has a width smaller than a width of the diaphragm.

Therefore, in the sound guiding portion through which the sound in the full-range frequency band output from the speaker unit passes, the width of the sound output part is smaller than the width of the diaphragm, and the sound is output from the elongated sound output part.

MODE FOR CARRYING OUT THE INVENTION

Hereinafter, an embodiment for implementing a sound output device according to the present technology will be described with reference to the accompanying drawings.

<Configuration of Sound Output Device>

First, a configuration of a sound output device will be described (see FIGS. 1 to 6).

The sound output device 1 can be placed on a placement surface (not illustrated) such as an upper surface of a table or a floor, or the like in either a vertical placement state in a vertically long state or a horizontal placement state in a horizontally long state.

The sound output device 1 includes, for example, two speaker units positioned vertically in the vertical placement state, and in the vertical placement state, outputs sound in a usage mode as a monaural type, and in the horizontal placement state, outputs sound in a usage mode as a stereo type.

Note that, in the following description, front, rear, upper, lower, left, and right directions indicate directions in a case where the sound output device 1 is in the vertical placement state. However, the front, rear, upper, lower, left, and right directions shown below are for convenience of description, and implementation of the present technology is not limited to these directions.

Figure 1:
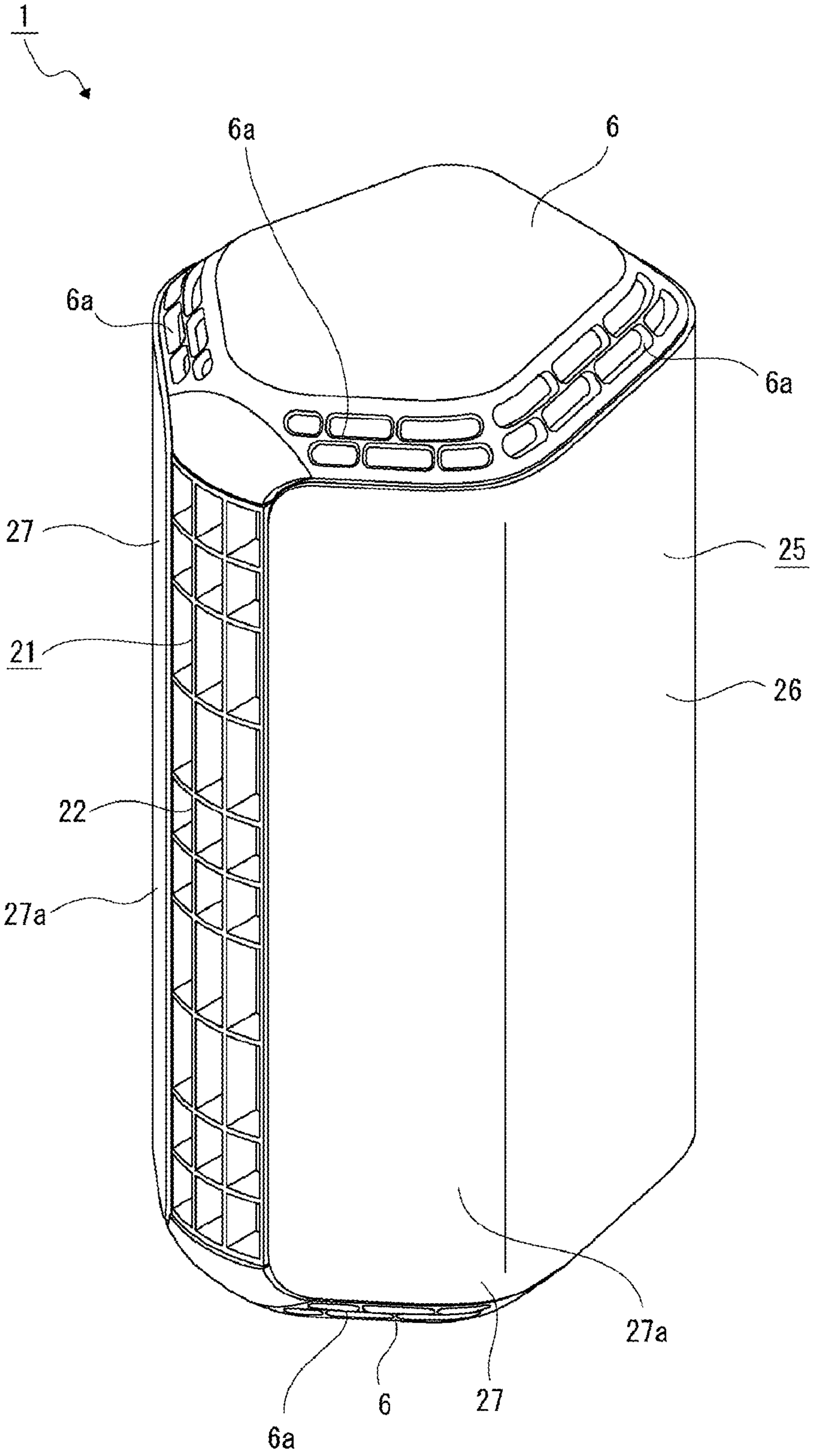
FIG. 1 illustrates an embodiment of a sound output device according to the present technology together with FIGS. 2 to 9, and is a perspective view of the sound output device.
Figure 2:
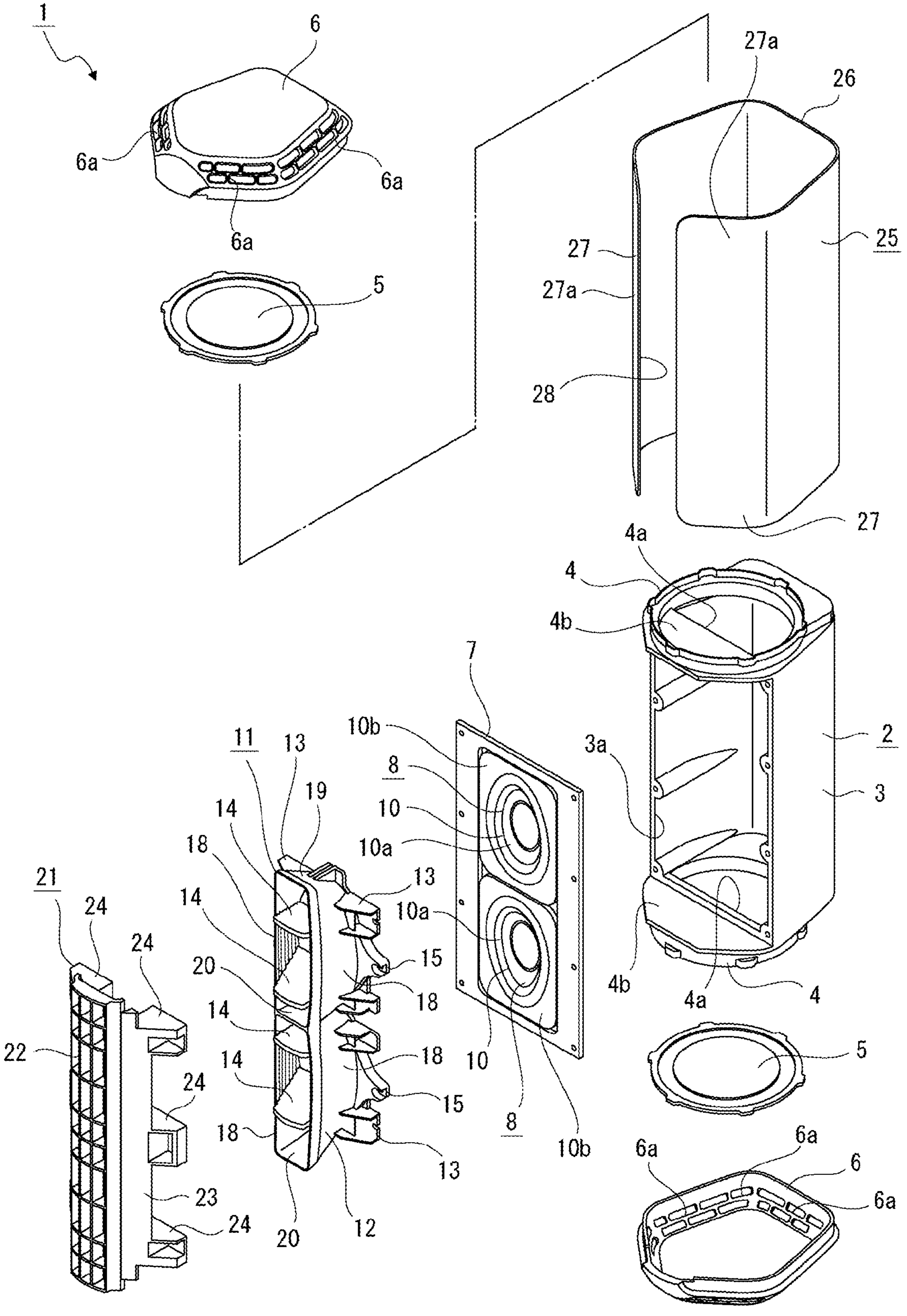
FIG. 2 is an exploded perspective view of the sound output device.

The sound output device 1 has a housing 2 that is vertically long and required units supported by or disposed in the housing 2 (see FIGS. 1 and 2). The housing 2 has a base portion 3 having a substantially semi-cylindrical shape and base end portions 4 and 4 provided continuously at both upper and lower ends of the base portion 3, respectively (see FIG. 2).

In the base portion 3, a vertically long rectangular covered hole 3*a* opening forward is formed. The base end portion 4 is formed in a substantially circular outer shape and has a communication hole 4*a* communicating with a space inside the base portion 3. The base end portion 4 has a front end portion that is provided as a protruding portion 4*b*, the front end portion being positioned more on a front side than the base portion 3 is, and the communication hole 4*a* is formed in a portion on the rear side of the protruding portion 4*b*.

Substantially disk-shaped passive radiators 5 and 5 are attached to the base end portions 4 and 4 of the housing 2 from the vertical direction, respectively, and the communication holes 4*a* and 4*a* are closed by the passive radiators 5 and 5, respectively. The passive radiator 5 amplifies and reinforces low-frequency sound, and powerful heavy and low sounds can be output.

Covers 6 and 6 are attached to the base end portions 4 and 4 of the housing 2 from the vertical direction, respectively. The cover 6 is attached to the base end portion 4 in a state of covering the passive radiator 5, and has a shallow recess opening toward the passive radiator 5 side. A plurality of sound holes 6*a* is formed in the cover 6.

A base plate 7 is attached to the housing 2 in a state of covering the covered hole 3*a*. The base plate 7 is formed in a vertically long substantially rectangular shape, and arrangement holes 7*a* and 7*a* are formed that are vertically separated (see FIGS. 3 and 4).

Speaker units 8 and 8 are attached to the base plate 7 in a vertically aligned state. The sound output from the speaker unit 8 is a full-range sound, and the frequency band of the speaker unit 8 is set to, for example, 50 Hz to 20 KHz.

Note that the number of speaker units 8 provided in the sound output device 1 may be any desired number, and one or three or more speaker units 8 may be provided.

The speaker unit 8 includes a drive unit 9 including a magnet, a yoke, and the like, and a diaphragm 10 that vibrates by the driving force of the drive unit 9. A portion of the diaphragm 10 excluding a portion on the outer peripheral side is provided as a vibration portion 10*a*, and a portion located at an outer side of the vibration portion 10*a* is provided as an attachment portion 10*b*. The vibration portion 10*a* has, for example, an outer peripheral portion formed in a curved shape, such as a circular shape, an elliptical shape, an egg shape, or the like when viewed in a front-rear direction.

The speaker unit 8 is positioned such that the attachment portion 10*b* of the diaphragm 10 is attached to the base plate 7 from the front side and the drive unit 9 is inserted into the arrangement hole 7*a* with a portion excluding a part of the drive unit 9 being located behind the base plate 7.

Figure 3:
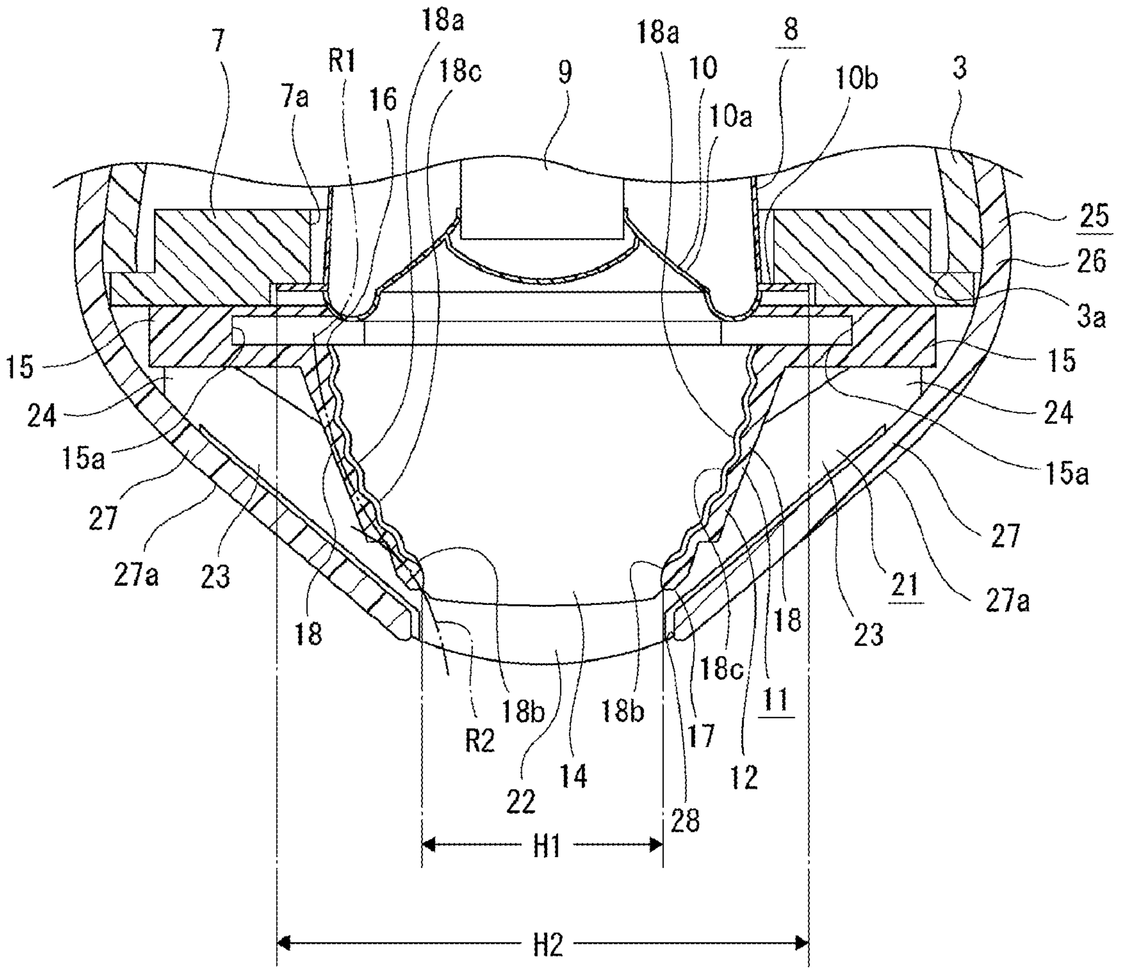
FIG. 3 is a horizontal cross-sectional view of the sound output device.
Figure 4:
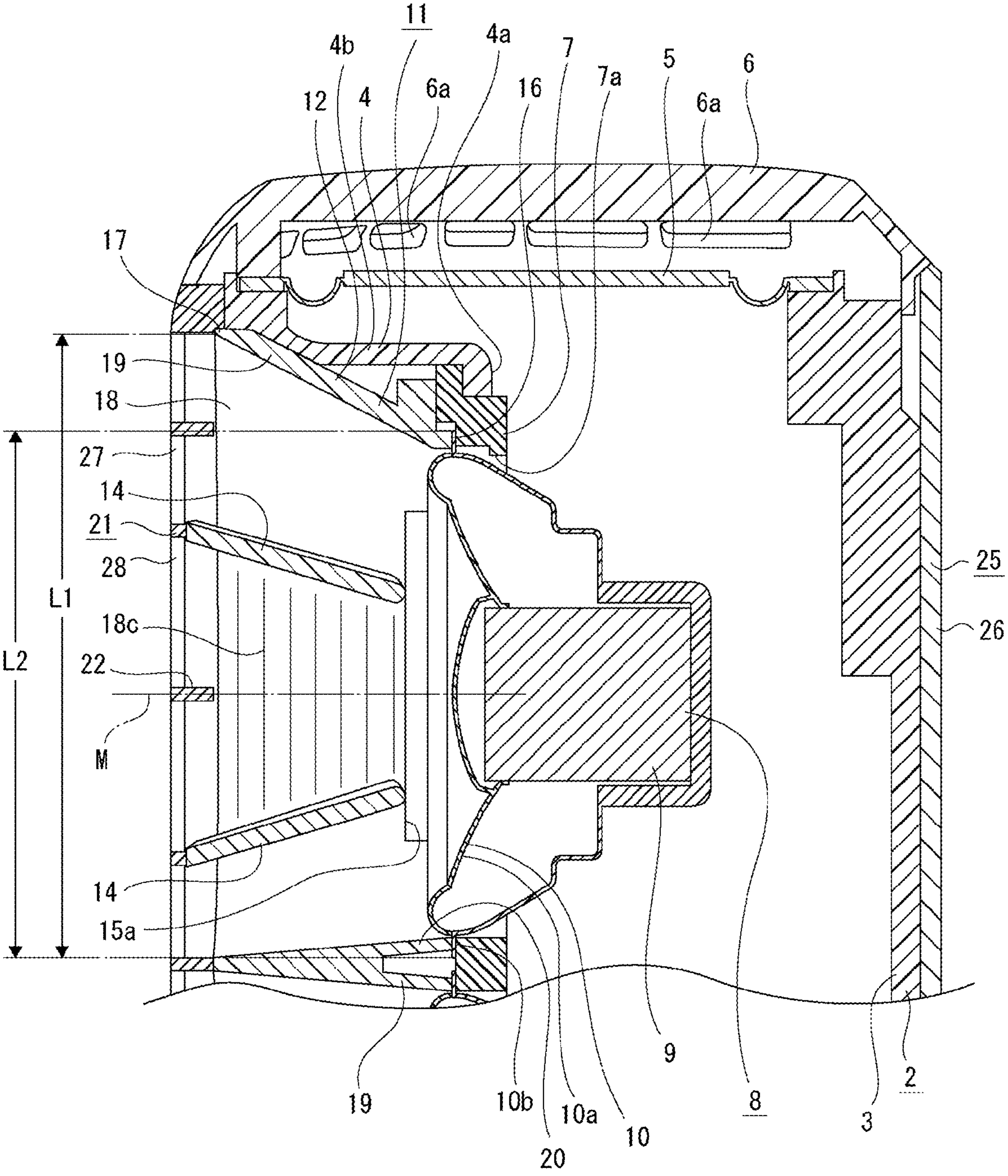
FIG. 4 is a vertical sectional view of the sound output device.

A sound control body 11 is attached to the base plate 7 (see FIGS. 2 to 4). The sound control body 11 includes cylindrical (square cylindrical) sound guiding portions 12 and 12 passing through in the front-rear direction, a plurality of attachment protrusions 13 protruding outward from rear end portions of the sound guiding portions 12 and 12, a plurality of control fins 14 provided inside the respective sound guiding portions 12 and 12, and functional protrusions 15, 15, . . . protruding from the respective sound guiding portions 12 and 12 (see FIGS. 3 to 6).

The sound guiding portion 12 is formed in a vertically long shape, and an opening on the rear side is provided as a sound input part 16 and an opening on the front side is provided as a sound output part 17. The inner shape of the sound input part 16 is slightly larger than the outer shape of the vibration portion 10*a* of the diaphragm 10, and the sound output part 17 is formed in a vertically long substantially rectangular shape. The size of the sound input part 16 is larger than the size of the sound output part 17, for example.

In the sound guiding portion 12, side surface portions 18 and 18 on the left and right sides are inclined so as to approach each other from the sound input part 16 toward the sound output part 17, and the width in the left-right direction gradually decreases from the sound input part 16 toward the sound output part 17 (see FIG. 3). Thus, a width H1 of the sound output part 17 in the sound guiding portion 12 is smaller than a width H2 of the diaphragm 10, in particular, the width of the vibration portion 10*a*.

On the other hand, in the sound guiding portion 12, an upper surface portion 19 and a lower surface portion 20 are inclined so as to be away from each other from the sound input part 16 toward the sound output part 17, and the length in the vertical direction gradually increases from the sound input part 16 toward the sound output part 17 (see FIG. 4). Thus, a length L1 of the sound output part 17 in the sound guiding portion 12 is longer than a length L2 of the diaphragm 10, in particular, the length of the vibration portion 10*a*.

As described above, in the sound guiding portion 12, the side surface portions 18 and 18 are inclined so as to approach each other from the sound input part 16 toward the sound output part 17, and the upper surface portion 19 and the lower surface portion 20 are inclined so as to be away from each other from the sound input part 16 toward the sound output part 17. The sound output part 17 is, therefore, formed in a vertically long shape and generally formed in a slit shape.

Note that the shape of the sound output part 17 may be any shape as long as it is a vertically long shape, and for example, in addition to a rectangular shape, the sound output part 17 may be formed in an elliptical shape or a super-elliptical shape. In addition to a shape in which the periphery is formed only by a straight portion or a shape in which the periphery is formed only by a curved portion, the sound output part 17 may have a periphery continuously formed by a straight portion and a curved portion.

The inner peripheral surface of the sound guiding portion 12 is formed in a shape in which two or more curved surfaces having different curvatures are continuous in the front-rear direction, the front rear direction being the traveling direction of the sound (sound wave) (see FIG. 3). Specifically, for example, the inner surface of the side surface portion 18 is configured by two or more curved surfaces having different curvatures between the front end portion and other portions, the portion other than the front end portion is formed as a first curved surface 18*a* having a small curvature, and the front end portion is formed as a second curved surface 18*b* having a larger curvature than the first curved surface 18*a*. For example, the first curved surface 18*a* is formed in a gentle curved surface that is concave outward in the left-right direction and has a curvature R1, and the second curved surface 18*b* is formed in a curved surface that is convex outward in the left-right direction and has a curvature R2 larger than the curvature R1.

Note that, in the above description, an example has been described in which the inner peripheral surface of the sound guiding portion 12 is configured by two curved surfaces having different curvatures. However, in the sound output device 1, the inner peripheral surface of the sound guiding portion 12 may be configured by three or more continuous curved surfaces having different curvatures.

For example, two control fins 14 that are spaced vertically are provided inside the sound guiding portion 12 (see FIGS. 3 to 6). The control fins 14 and 14 have a rear end that is positioned slightly more on a front side than the rear end of the sound guiding portion 12 is, a front end positioned that is positioned slightly more on a front side than the front end of the sound guiding portion 12 is, and are inclined so as to be away from each other from the sound input part 16 toward the sound output part 17, and are oriented so as not to hinder the travel of the sound output from the speaker unit 8 (see FIG. 4).

The control fin 14 is, therefore, inclined with respect to a central axis M of the diaphragm 10. Both left and right end portions of the control fin 14 are continuous with the inner surfaces of the side surface portions 18 and 18, respectively (see FIGS. 3 and 4).

The control fin 14 on an upper side is positioned to be spaced downward from the upper surface portion 19, and the control fin 14 on a lower side is positioned to be spaced upward from the lower surface portion 20. Note that the control fin 14 on the upper side is gently curved so as to be convex upward, and the control fin 14 on the lower side is gently curved so as to be convex downward. Since the control fins 14 and 14 are gently curved in this manner, the rigidity of the control fins 14 and 14 is increased.

Note that the number of control fins 14 provided in the sound output device 1 may be any desired number, and one or three or more control fins 14 may be provided for a single sound guiding portion 12.

On the inner surfaces of the side surface portions 18 and 18, portions between the control fins 14 and 14 are formed as uneven surfaces 18*c* and 18*c* in which a plurality of unevennesses is continuous except for some portions. The uneven surface 18*c* is formed on a portion other than the front end portion of the side surface portion 18. Since the uneven surface 18*c* is formed on a portion other than the front end portion of the side surface portion 18, high rigidity of the front end portion of the side surface portion 18 is maintained. However, in the sound guiding portion 12, the entire inner surface of the side surface portion 18 between the control fins 14 and 14 may be formed as the uneven surface 18*c*.

An arrangement direction of the unevenness of the uneven surface 18*c* is a direction connecting the sound input part 16 and the sound output part 17. However, the arrangement direction of the unevenness of the uneven surface 18*c* may be a direction other than the direction connecting the sound input part 16 and the sound output part 17.

Figure 5:
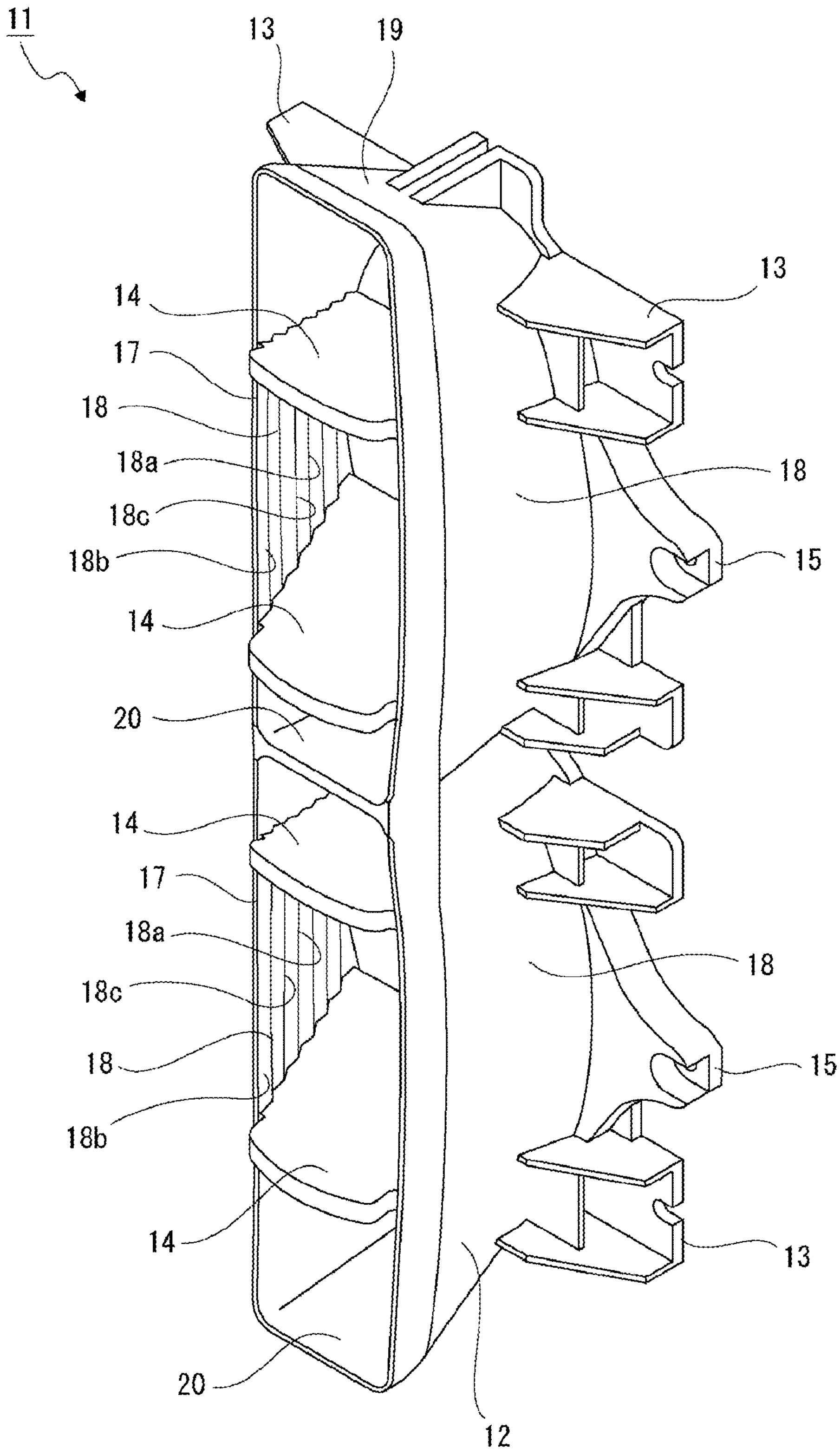
FIG. 5 is a perspective view of a sound control body.
Figure 6:
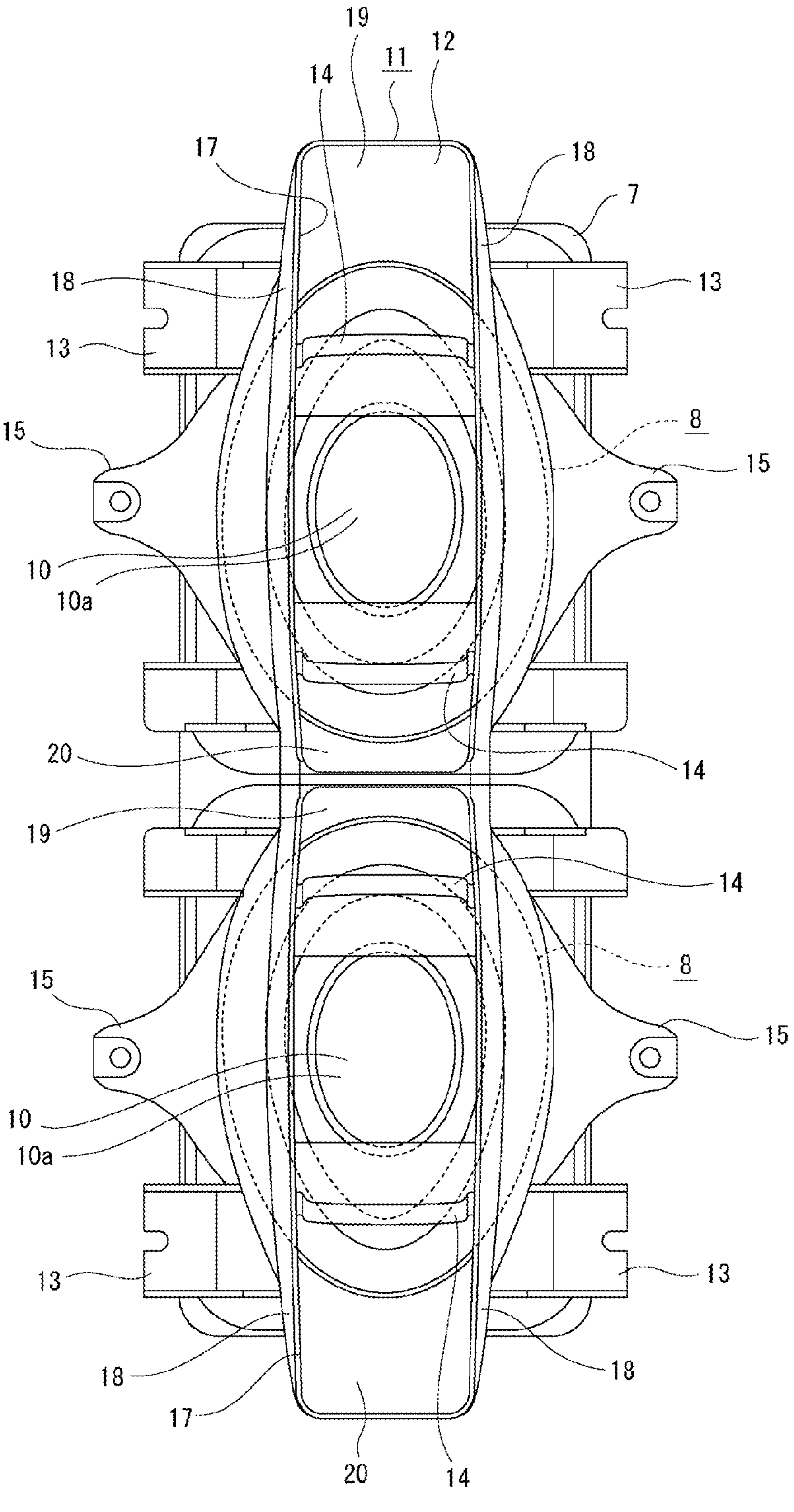
FIG. 6 is a front view illustrating the sound control body, speaker units, and a base plate.
Figure 7:
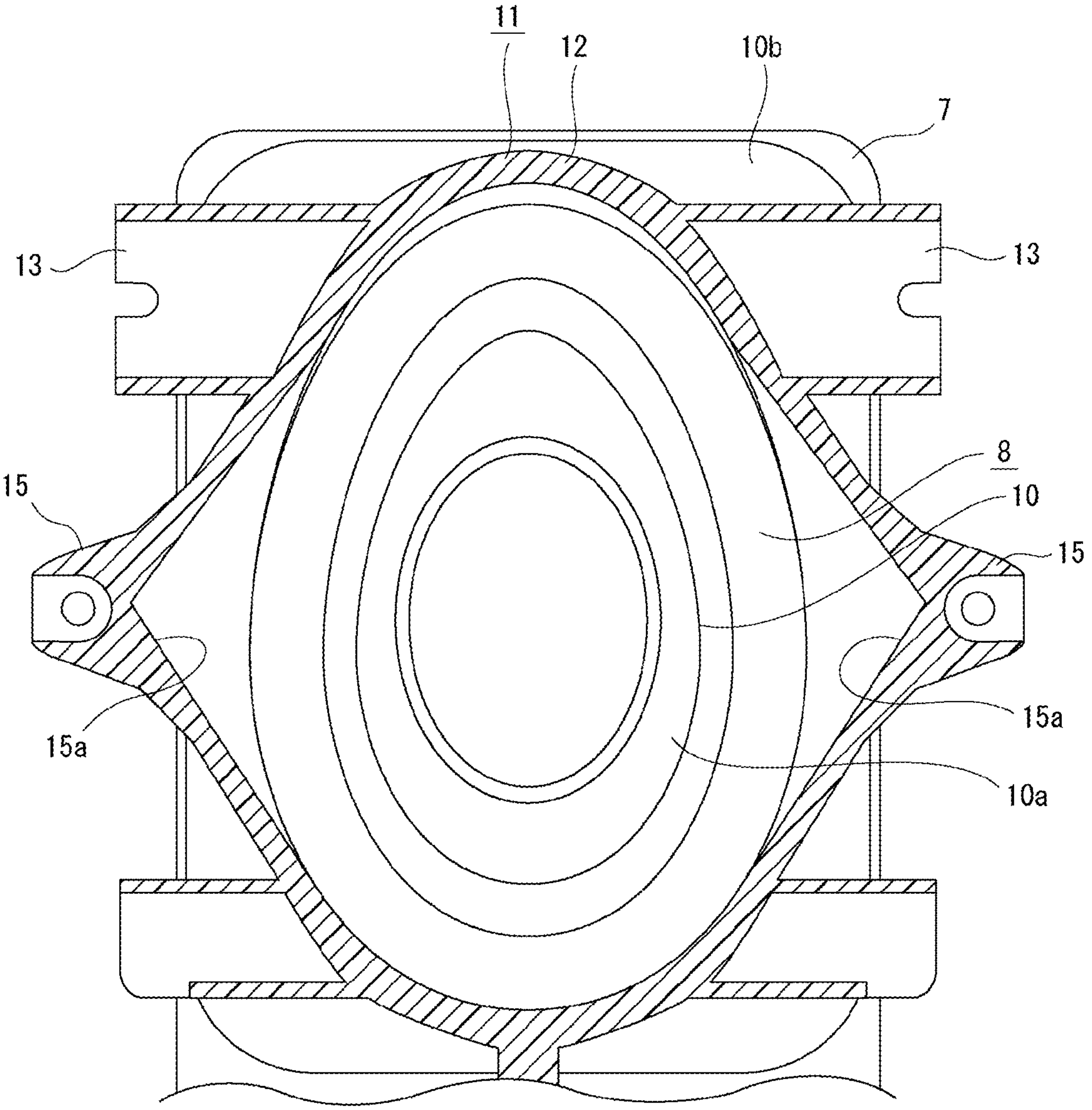
FIG. 7 is a cross-sectional view illustrating a recessed space.

The functional protrusions 15 and 15 protrude from the rear end portion of the sound guiding portion 12 in directions away from each other in the left-right direction (see FIGS. 3, 5, and 6). The functional protrusion 15 protrudes, for example, from a central portion in the vertical direction of the sound guiding portion 12. The functional protrusion 15 is formed in, for example, a substantially triangular shape in which the vertical width decreases toward the outside in the left-right direction. The functional protrusion 15 opens to the sound guiding portion 12 side, and the internal space is formed as a substantially triangular recessed space 15*a* (see FIGS. 3 and 7).

Note that the functional protrusion 15 may have a function as the attachment protrusion 13. Furthermore, the recessed space 15*a* may be formed at any position as long as it is a position around the passing portion of the sound output from the speaker unit 8, and for example, may be formed not only on the sound input part 16 side but also on the sound output part 17 side or between the sound input part 16 and the sound output part 17.

Note that the shape of the recessed space 15*a* may be any shape, but it is desirable that the wall surfaces defining the recessed spaces 15*a* and 15*a* are wall surfaces that are not in a state of facing each other, and for example, it is desirable that wall surfaces facing in the left-right direction do not exist in the wall surfaces defining the recessed spaces 15*a* and 15*a*. For example, the recessed space 15*a* may be formed in a semicircular shape, a semi-elliptical shape, or the like.

In the sound control body 11, the attachment protrusions 13, 13, . . . are attached to the base plate 7 from the front side by screwing or the like. In a state where the sound control body 11 is attached to the base plate 7, the sound input part 16 is located on the outer peripheral side of the vibration portion 10*a* in the diaphragm 10 (see FIG. 3). Therefore, the functional protrusions 15 and 15 are positioned near the outer peripheral side of the vibration portion 10*a*.

In a state where the sound control body 11 is attached to the base plate 7 as described above, a front panel 21 is attached to the base plate 7 from the front side of the sound control body 11 (see FIGS. 1 and 2).

The front panel 21 includes a substantially rectangular guard portion 22 formed in a mesh shape and having a vertically long outer shape, side portions 23 and 23 protruding from left and right end portions of the guard portion 22, respectively, and attachment piece portions 24, 24, . . . protruding outward in the left and right direction from left and right end portions of the side portions 23 and 23, respectively. The outer shape of the guard portion 22 is formed in substantially the same size and the same shape as the outer shape of the sound output part 17 in the sound guiding portion 12.

The outer shape of the guard portion 22 is formed in the same size and the same shape as the sound output part 17 of the sound control body 11. For example, in a case where the sound output part 17 has a rectangular shape, the guard portion 22 is also formed in a rectangular shape having the same size as the sound output part 17. In a case where the sound output part 17 has an elliptical shape, the guard portion 22 is also formed in an elliptical shape having the same size as the sound output part 17.

Each of the side portions 23 and 23 protrudes diagonally and outwardly rearward from the guard portion 22.

In the front panel 21, for example, the attachment piece portions 24, 24, . . . overlap the attachment protrusions 13, 13, . . . of the sound control body 11 from the front side one by one, and are attached and fastened together with the attachment protrusions 13, 13, . . . to the base plate 7 by screwing or the like. In a state where the front panel 21 is attached to the base plate 7, the guard portion 22 covers the sound guiding portion 12 from the front side (see FIGS. 3 and 4).

In a state where the front panel 21 is attached to the base plate 7 as described above, a cover panel 25 is attached to the housing 2.

The cover panel 25 includes a main body portion 26 that covers the entire portion from the side surface portions to the rear surface portion of the housing 2 from the periphery, and inclined portions 27 and 27 that are continuous with respective front edges on both left and right sides of the main body portion 26. The inclined portion 27 is inclined in a state where an inner end in the left-right direction is positioned more on a front side than an outer end is, and an outer surface thereof is formed as an inclined surface 27*a*. The inclined surface 27*a* faces diagonally and outwardly frontward.

A vertically long space (gap) is formed between the inclined portions 27 and 27 of the cover panel 25, and this space is a sound emission hole 28. The width of the sound emission hole 28 in the left-right direction is substantially the same as the width of the guard portion 22 of the front panel 21 in the left-right direction, and the length in the vertical direction is substantially the same as the length of the guard portion 22 in the vertical direction.

In a state where the cover panel 25 is attached to the housing 2, the side portions 23 and 23 of the front panel 21 and the attachment piece portions 24, 24, . . . are covered from the front side (outside) by the respective inclined portions 27 and 27. Thus, in a state where the cover panel 25 is attached to the housing 2, the guard portion 22 of the front panel 21 is positioned in the sound emission hole 28. In addition, the inclined surfaces 27*a* and 27*a* are displaced from the sound input part 16 side to the sound output part 17 side of the sound control body 11 as approaching the sound emission hole 28 in the left-right direction (width direction).

<Output of Sound>

In the sound output device 1 configured as described above, when the sound is output from each of the speaker units 8 and 8, the output sound passes through the inside of each of the sound guiding portions 12 and 12 of the sound control body 11 and is emitted from the sound emission hole 28 to the outside via the guard portion 22. At this time, for example, a full-range sound having a frequency band of 50 Hz to 20 KHz is output from the speaker unit 8, and the passive radiators 5 and 5 amplify and reinforce the low-frequency sound.

<Summary>

As described above, the sound output device 1 includes the speaker unit 8 that includes the diaphragm 10 and outputs sound in a full-range frequency band and the sound control body 11 that includes the sound guiding portion 12 through which sound output from the speaker unit 8 passes, and the width H1 of the sound output part 17 is smaller than the width H2 of the diaphragm 10.

Therefore, in the sound guiding portion 12 through which sound in a full-range frequency band output from the speaker unit 8 passes, the width H1 of the sound output part 17 is smaller than the width H2 of the diaphragm 10, and the sound is output from the elongated sound output part 17. As a result, the wider directionality can be achieved with the wide bandwidth of the sound output from the speaker unit 8 being secured.

In particular, by forming the sound output part 17 in an elongated shape and forming it in a slit shape as a whole, the output sound can become a linear sound source, and the sound can be widened in directionality even in a state where a sound in a wide frequency band is output.

Furthermore, in the sound control body 11, the sound guiding portion 12 has a width that decreases from the sound input part 16 toward the sound output part 17.

In this regard, since the sound output from the speaker unit 8 passes through the sound guiding portion 12 having a width that decreases from the sound input part 16 toward the sound output part 17, the sound becomes a linear sound source as it travels toward the sound output part 17, and the sound can be further widened in directionality.

Furthermore, the cover panel 25 having the sound emission hole 28 positioned corresponding to the sound output part 17 is provided, and a part of an outer surface of the cover panel 25 is formed as the inclined surfaces 27*a* and 27*a* that are displaced from the sound input part 16 side to the sound output part 17 side as approaching the sound emission hole 28 in the width direction.

In this regard, since the sound output from the sound output part 17 via the sound emission hole 28 is likely to spread in the width direction of the sound emission hole 28, the sound can be further widened in directionality and the sound pressure frequency characteristics can be stabilized.

Furthermore, since the control fin 14 that controls sound from the sound input part 16 toward the sound output part 17 is provided inside the sound guiding portion 12, occurrence of specific acoustic resonance is suppressed by the control fin 14, and sound quality can be improved.

In addition, since the control fin 14 is inclined with respect to the central axis M of the diaphragm 10, travel of the sound output from the speaker unit 8 is hardly hindered by the control fin 14, and a stable output state of the sound can be secured.

Furthermore, since the recessed space 15*a* is formed on the outer peripheral side of the diaphragm 10 in the sound control body 11, a sound absorbing effect occurs in the recessed space 15*a*, and the occurrence of specific acoustic resonance is suppressed, and sound quality can be improved.

Furthermore, the inner peripheral surface of the sound guiding portion 12 is formed in a shape in which the first curved surface 18*a* and the second curved surface 18*b* having different curvatures are continuous in the traveling direction of the sound.

In this regard, since the internal space of the sound guiding portion 12 can be maximized with the inner surface shape of the sound guiding portion 12 being formed into a shape that hardly hinders the travel of the sound, the occurrence of specific acoustic resonance is suppressed and the sound quality can be improved.

In addition, since at least a part of the inner peripheral surface of the sound guiding portion 12 is formed as the uneven surface 18*c* in which a plurality of unevennesses is continuous, the occurrence of specific acoustic resonance is suppressed by the uneven surface 18*c*, and sound quality can be improved.

<Others>

Figure 8:
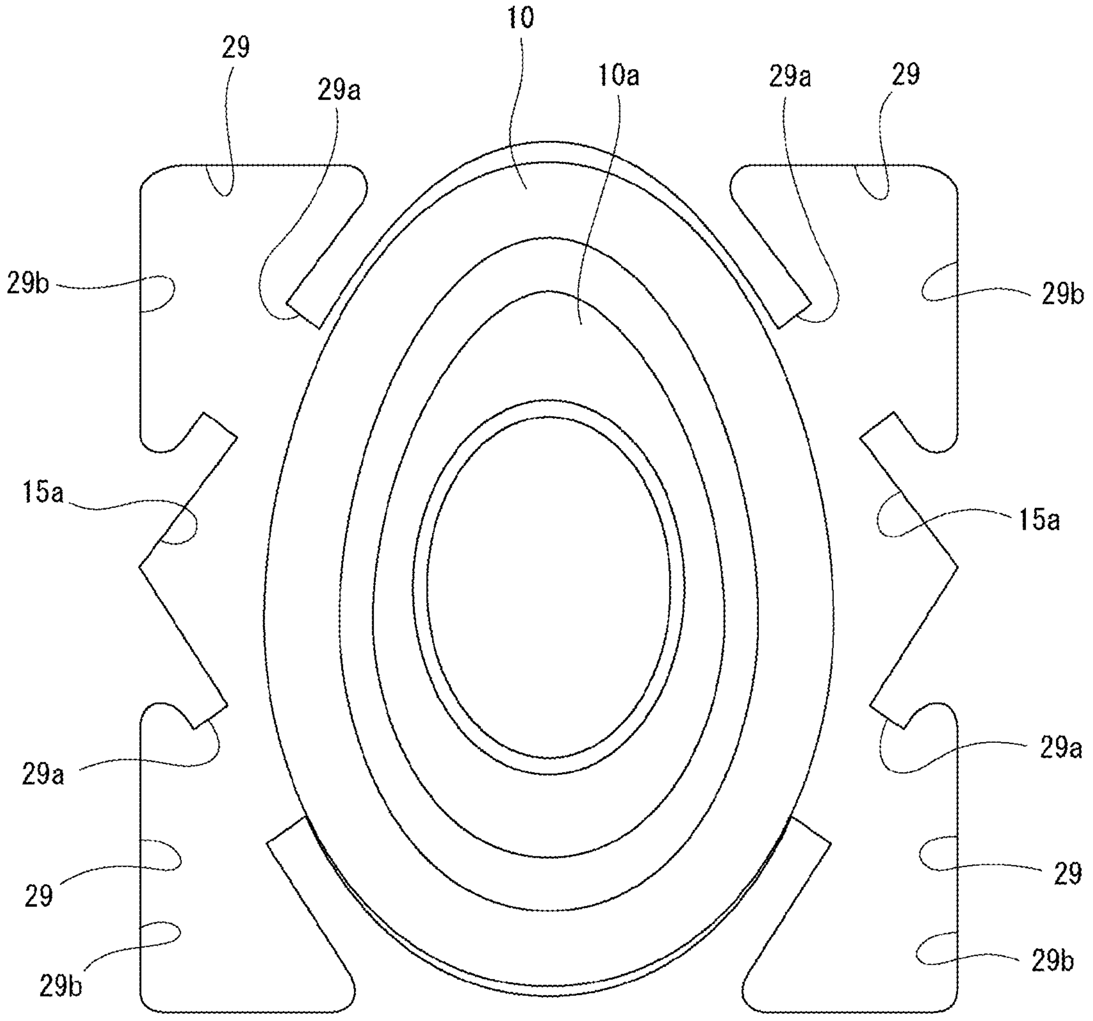
FIG. 8 is a front view schematically illustrating an acoustic resonance circuit.

In the sound output device 1, an acoustic resonance circuit 29 may be formed (see FIG. 8). The acoustic resonance circuit 29 is formed, for example, in the sound control body 11, is formed as an internal space of a portion protruding from the rear end portion of the sound guiding portion 12 similarly to the functional protrusion 15, and configured by a first space 29*a* having a small volume and a second space 29*b* having a volume larger than that of the first space 29*a*. The first space 29*a* is positioned on the diaphragm 10 side and opens to the diaphragm side, and the second space 29*b* communicates with the first space 29*a* and is formed on the opposite side of the diaphragm 10 across the first space 29*a*. Such an acoustic resonance circuit 29 is referred to as a Helmholtz resonance circuit, and has a function of suppressing an unnecessary increase in sound pressure due to the occurrence of acoustic resonance of the sound output from the speaker unit 8.

For example, a plurality of acoustic resonance circuits 29 is formed around the diaphragm 10, and two acoustic resonance circuits are formed above and below each of the recessed spaces 15*a* and 15*a*. However, the number of acoustic resonance circuits 29 formed may be any desired number, and may be the number other than four. Furthermore, the formation position of the acoustic resonance circuit 29 may be any position as long as it is a position that exhibits a sound absorbing effect on the sound output from the speaker unit 8.

Since the acoustic resonance circuit 29 configured by the first space 29*a* and the second space 29*b* positioned on the outer peripheral side of the diaphragm 10 is formed in the sound control body 11 in this manner, the first space 29*a* and the second space 29*b* forms an acoustic resonance circuit, and thus an unnecessary increase in sound pressure due to acoustic resonance can be suppressed and sound quality can be improved.

Note that, in the sound output device 1, at least one of the first space 29*a* or the second space 29*b* may be provided with a sound absorbing material (not illustrated).

By providing the sound absorbing material, a sound absorbing effect is generated by the sound absorbing material, so that generation of specific acoustic resonance is further suppressed and sound quality can be further improved.

Note that the sound absorbing material may be provided in the recessed space 15*a* in addition to at least one of the first space 29*a* or the second space 29*b*, or may be provided only in the recessed space 15*a* without being provided in the first space 29*a* or the second space 29*b*.

Furthermore, the acoustic resonance circuit formed in the sound output device 1 is not limited to the Helmholtz resonance circuit, and for example, an acoustic tube may be used as the acoustic resonance circuit.

Furthermore, the acoustic resonance circuit including the acoustic resonance circuit 29 formed in the sound output device 1 may be formed at any position as long as it is a position around the passing portion of the sound output from the speaker unit 8. For example, the acoustic resonance circuit may be formed not only on the sound input part 16 side but also on the sound output part 17 side or between the sound input part 16 and the sound output part 17.

Figure 9:
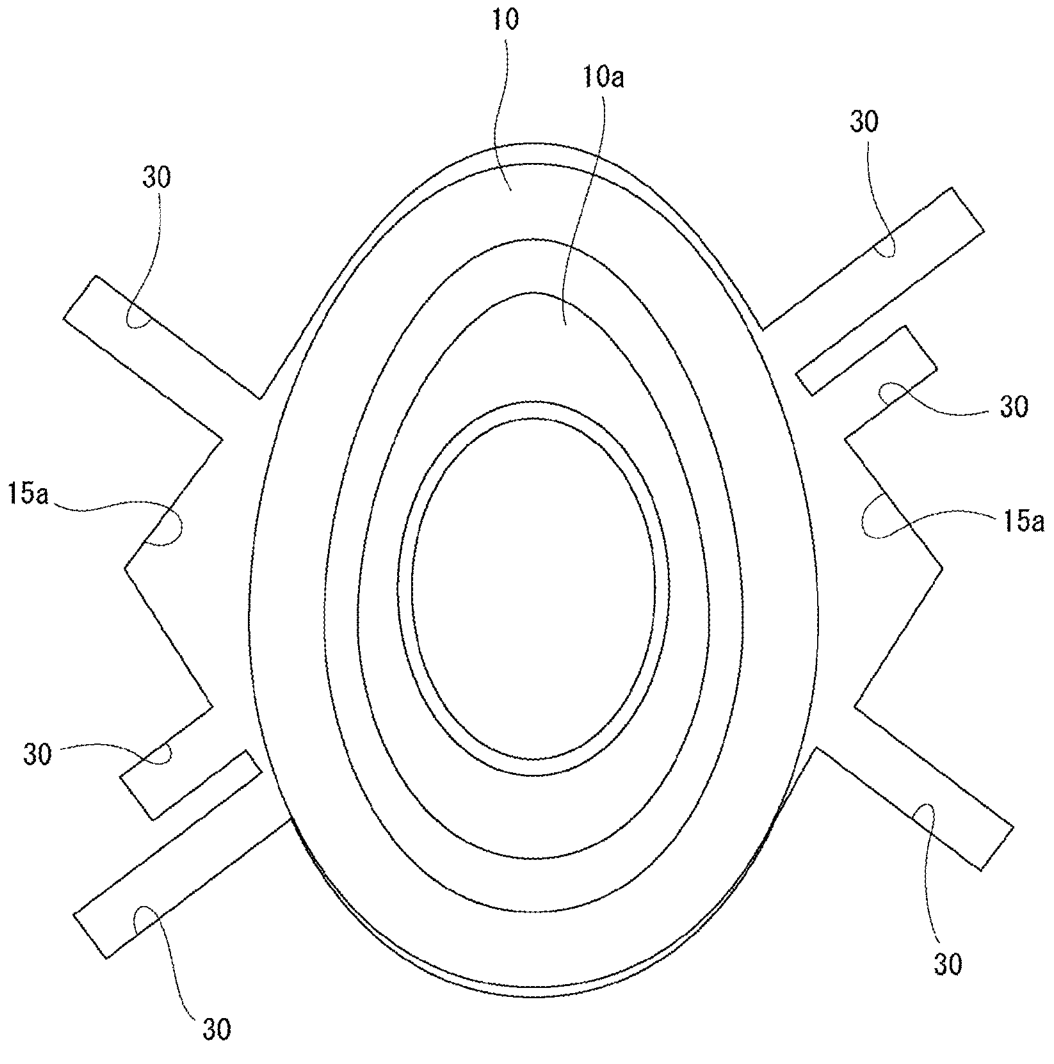
FIG. 9 is a front view schematically illustrating a sound conduit.

Furthermore, in the sound output device 1, a sound conduit 30 may be formed instead of the acoustic resonance circuit 29 (see FIG. 9). The length and the number of the sound conduits 30 may be any desired length or number, and for example, one sound conduit 30 may be formed or a plurality of the sound conduits 30 may be formed in the circumferential direction of the diaphragm 10. Furthermore, the formation position of the sound conduit 30 may also be any position as long as it is a position that exhibits a sound absorbing effect on the sound output from the speaker unit 8.

Such a sound conduit 30 has a function of suppressing an unnecessary increase in sound pressure due to the occurrence of acoustic resonance of the sound output from the speaker unit 8. In this regard, by forming the sound conduit 30, an unnecessary increase in sound pressure due to acoustic resonance is suppressed, and sound quality can be improved.

Note that, in the sound output device 1, the sound conduit 30 may be provided with a sound absorbing material (not illustrated).

By providing the sound absorbing material, a sound absorbing effect is generated by the sound absorbing material, so that generation of specific acoustic resonance is further suppressed and sound quality can be further improved.

Note that, similarly to the acoustic resonance circuit 29, the sound conduit 30 may be formed at any position as long as it is a position around the passing portion of the sound output from the speaker unit 8, and for example, may be formed not only on the sound input part 16 side but also on the sound output part 17 side or between the sound input part 16 and the sound output part 17.

<Present Technology>

The present technology can have the following configuration.

(1)

A sound output device including:

a speaker unit that includes a diaphragm and outputs sound in a full-range frequency band; and a sound control body that includes a sound guiding portion through which sound output from the speaker unit passes, in which the sound guiding portion has an opening on a side of the speaker unit, the opening being provided as a sound input part, and has an opposite opening on a side opposite to the sound input part, the opposite opening being provided as a sound output part, the sound output part is formed in a shape having a width direction and a length direction, and the sound output part has a width smaller than a width of the diaphragm.

(2)

The sound output device according to (1) above, in which the sound guiding portion has a width that decreases from the sound input part toward the sound output part.

(3)

The sound output device according to (1) or (2) above, in which a cover panel that has a sound emission hole positioned corresponding to the sound output part and formed in a shape having a width direction and a length direction is provided, and at least a part of an outer surface of the cover panel is formed as an inclined surface that is displaced from a side of the sound input part to a side of the sound output part as approaching the sound emission hole in the width direction.

(4)

The sound output device according to any one of (1) to (3) above, in which a control fin that controls sound from the sound input part toward the sound output part is provided inside the sound guiding portion.

(5)

The sound output device according to (4) above, in which the control fin is inclined with respect to a central axis of the diaphragm.

(6)

The sound output device according to any one of (1) to (5) above, in which the sound control body has a recessed space positioned on an outer peripheral side of the diaphragm.

(7)

The sound output device according to any one of (1) to (6) above, in which an inner peripheral surface of the sound guiding portion is formed in a shape in which two or more curved surfaces having different curvatures are continuous in a traveling direction of sound.

(8)

The sound output device according to any one of (1) to (7) above, in which at least a part of an inner peripheral surface of the sound guiding portion is formed as an uneven surface in which a plurality of unevennesses is continuous.

(9)

The sound output device according to any one of (1) to (8) above, in which the sound control body has a first space and a second space that are positioned on an outer peripheral side of the diaphragm and are continuously formed, and the first space has a smaller volume and is positioned closer to the diaphragm than the second space.

(10)

The sound output device according to any one of (1) to (8) above, in which the sound control body has a sound conduit positioned on an outer peripheral side of the diaphragm.

(11)

The sound output device according to (9) or (10) above, in which at least one of the first space or the second space is provided with a sound absorbing material.

REFERENCE SIGNS LIST

1 Sound output device
8 Speaker unit
10 Diaphragm
11 Sound control body
12 Sound guiding portion
14 Control fin
15*a* Recessed space
16 Sound input part
17 Sound output part
18*a* First curved surface
18*b* Second curved surface
18*c* Uneven surface
25 Cover panel
27*a* Inclined surface
28 Sound emission hole
29*a* First space
29*b* Second space

The invention claimed is:

1. A sound output device, comprising:

at least two speaker units that include a diaphragm having a shape having a width direction and a length direction and output sound in a full-range frequency band; and a sound control body including at least two sound guiding portions that are provided for respective speaker units of the at least two speaker units and through which sound output from the respective speaker units of the at least two speaker units passes, wherein the at least two sound guiding portions have a first opening on a side of the at least two speaker units, the first opening is provided as a sound input part, the at least two sound guiding portions have a second opening on a side opposite to the sound input part, the second opening is provided as a sound output part, the sound output part is formed in a shape having a width direction and a length direction, the sound output part has a width smaller than a width of the diaphragm, the at least two sound guiding portions have a width that decreases from the sound input part toward the sound output part, a cover panel that has a sound emission hole positioned corresponding to the sound output part and formed in a shape having the width direction and the length direction is provided, at least a part of an outer surface of the cover panel is formed as an inclined surface that is displaced from a side of the sound input part to a side of the sound output part as approaching the sound emission hole in the width direction, and a guard portion that covers both of the at least two sound guiding portions from the side of the sound output part and is positioned in the sound emission hole and through which sound having passed through the at least two sound guiding portions passes is provided.

2. The sound output device according to claim 1, wherein a control fin that controls sound from the sound input part toward the sound output part is provided inside the at least two sound guiding portions, the control fin has a rear end positioned slightly more in a front side than a rear end of the at least two the sound guiding portions is, and the control fin has a front end positioned slightly more in a front side than a front end of the at least two sound guiding portions is.

3. The sound output device according to claim 2, wherein the control fin is inclined with respect to a central axis of the diaphragm.

4. The sound output device according to claim 1, wherein the sound control body has a recessed space positioned on an outer peripheral side of the diaphragm in the width direction.

5. The sound output device according to claim 1, wherein an inner peripheral surface of the at least two sound guiding portions is formed in a shape in which two or more curved surfaces having different curvatures are continuous in a traveling direction of sound.

6. The sound output device according to claim 1, wherein at least a part of an inner peripheral surface of the at least two sound guiding portions is formed as an uneven surface in which a plurality of unevennesses is continuous.

7. The sound output device according to claim 1, wherein the sound control body has a first space and a second space that are positioned on an outer peripheral side of the diaphragm and are continuously formed, and the first space has a smaller volume and is positioned closer to the diaphragm than the second space.

8. The sound output device according to claim 7, wherein at least one of the first space or the second space is provided with a sound absorbing material.

9. The sound output device according to claim 1, wherein the sound control body has a sound conduit positioned on an outer peripheral side of the diaphragm.

* * * * *